(12) United States Patent
Kim

(10) Patent No.: US 10,935,280 B2
(45) Date of Patent: Mar. 2, 2021

(54) EXTREME CONDENSING BOILER

(71) Applicant: Dongho Kim, Seoul (KR)

(72) Inventor: Dongho Kim, Seoul (KR)

( * ) Notice: Subject to any disclaimer, the term of this patent is extended or adjusted under 35 U.S.C. 154(b) by 335 days.

(21) Appl. No.: 16/026,919

(22) Filed: Jul. 3, 2018

(65) Prior Publication Data

US 2019/0293320 A1 Sep. 26, 2019

(30) Foreign Application Priority Data

Mar. 23, 2018 (KR) ........................ 10-2018-0033867

(51) Int. Cl.
*F24H 8/00* (2006.01)
*F24H 1/14* (2006.01)
*F24H 9/14* (2006.01)
*F23L 15/04* (2006.01)

(52) U.S. Cl.
CPC ............. *F24H 8/006* (2013.01); *F24H 1/145* (2013.01); *F24H 9/146* (2013.01); *F24H 9/148* (2013.01); *F23L 15/04* (2013.01)

(58) Field of Classification Search
CPC ...................................................... F24H 8/006
See application file for complete search history.

(56) References Cited

U.S. PATENT DOCUMENTS

| | | | | |
|---|---|---|---|---|
| 2,475,025 A | * | 7/1949 | Huff .......................... | B01J 8/008 518/712 |
| 3,610,329 A | * | 10/1971 | Markert ................... | C10K 1/16 165/132 |
| 4,140,176 A | * | 2/1979 | Essebaggers ........... | F22B 1/063 122/483 |
| 4,142,580 A | * | 3/1979 | Bailey ...................... | F28D 7/12 122/181 |
| 4,336,770 A | * | 6/1982 | Kaneko ................... | F28D 7/106 122/130 |
| 4,431,049 A | * | 2/1984 | Zamma ................... | F22B 1/021 165/142 |

(Continued)

FOREIGN PATENT DOCUMENTS

WO WO-8401206 A1 * 3/1984 ............... F24H 1/50

OTHER PUBLICATIONS

WO8401206A1—machine translation (Year: 1983).*

*Primary Examiner* — Nathaniel Herzfeld
(74) *Attorney, Agent, or Firm* — John K. Park; Park Law Firm

(57) ABSTRACT

An extreme condensing boiler includes cold and hot water headers, burner, and multi-tubing heat exchanger, so that cold water absorbs heat from exhaust gas of the burner being heated to medium-hot, which absorbs heat generated by the burner being heated to hot water through absorbing heat from both sides of tube portion of the multi-tubing heat exchanger, and so that the hot water is delivered to the hot water header, and a combustion air heat exchanger is provided around the multi-tubing heat exchanger. The condensing boiler uses dual/triple tubes for fire and water tubes, increasing efficiency by absorbing heat from both sides. The fire tube is surrounded by the cold water tube so as to minimize exhaust gas temperature and maximize condensing by absorbing waste heat. The condensing boiler realizes a direct fire boiler through the fire and water tubes, and an energy-saving tankless boiler including headers and tubes only.

7 Claims, 10 Drawing Sheets

(56) References Cited

U.S. PATENT DOCUMENTS

| | | | | |
|---|---|---|---|---|
| 5,425,415 A | * | 6/1995 | Master | F28D 7/106 |
| | | | | 122/348 |
| 8,672,021 B2 | * | 3/2014 | Montestruc, III | F28D 7/16 |
| | | | | 165/134.1 |

* cited by examiner (Standard Boiler)

(Cross-section of Standard Boiler)

(Combination Boiler)

EXTREME CONDENSING BOILER

BACKGROUND OF THE INVENTION

Field of Technology

The invention relates to an extreme condensing boiler, more specifically to the extreme condensing boiler, as referred to as the condensing boiler, which adopts heat-exchanging structure with triple-tubing or double-tubing tube including an inner tube (fire tube), a middle tube (cold water), and an outer tube (hot water), and in which cold water descends through a cold water header and is turned into medium-hot water, and the medium-hot water ascends again and absorbs heat from around it and is turned into hot water, to be supplied to a hot water header, so that the temperature of exhaust gas is lowered and carbon emission is minimized by absorbing waste heat from the exhaust gas, preventing the global warming by air pollution and maximizing the thermal efficiency through harvesting heat on both sides.

Background of Invention

In general, a boiler used for supplying heating and supplying hot water in houses can be categorized into a regular boiler and a condensing boiler according to how to retrieve combustion heat for heating water.

All the conventional condensing boilers includes a heat exchanger for producing hot water with heat for heating water and a separate waste-heat heat exchanger for retrieving latent heat of vapor in the exhaust gas.

The heat exchanger (CORE) used in modern boilers including condensing boilers and regular boilers includes a single tube structure of water tube or fire tube type.

The single tube type boiler was invented in the period of British Industrial Revolution in the Eighteenth century, uses a heat exchanger (CORE) developed to use coal, firewood, etc. for fuel, and therefore it is a 300 years old device having a very low efficiency of absorbing heat.

Since high combustion rate fuel such as petroleum, LNG-gas, etc. is used in the single tube type boiler developed for fuel such as coal, firewood, etc. and heat of high temperature is supplied by powerful burners with air blower for supplying huge amount of combustion air in order to increase fuel efficiency, much of thermal energy that the three centuries old single tube type of heat exchanger could not retrieve is released into the atmosphere, wasting a lot of energy and causing the global warming with air pollution through emitting exhaust gas of high temperature, especially, carbon dioxide (CO2).

According to environment research organizations that investigate factors causing the global warming, the exhaust gas from boilers is more responsible for the air pollution and the global warming than exhaust gas from automobiles.

Therefore, a need for extreme condensing boilers of new concepts has been present for conserving fast-repleting fossil fuel, preventing the global warming, and protecting the environment through renovating the structure of the single tube type boilers from the 18th century.

Related technology includes Korean Patent No. 10-1196913 (Oct. 26, 2012, Title of Invention: "Hot water storage type PID control condensing boiler").

SUMMARY OF THE INVENTION

Problem to Solve

The present invention contrives to solve the disadvantages of the prior art, and is to provide an extreme condensing boiler, which has a slim and tall module structure, and adopts heat-exchanging structure with triple-tubing or double-tubing tube including an inner tube (fire tube), a middle tube (cold water), and an outer tube (hot water), and in which cold water descends through a cold water header and is turned into medium-hot water, and the medium-hot water ascends again and absorbs heat from around it and is turned into hot water, to be supplied to a hot water header, so that the temperature of exhaust gas is lowered and carbon emission is minimized by absorbing waste heat from the exhaust gas, preventing the global warming by air pollution and maximizing the thermal efficiency through harvesting heat on both sides.

Solutions to Problem

In order to achieve the above goals, a condensing boiler according to the invention comprises: a cold water header provided in an upper portion of a main body and configured for receiving and distributing cold water to a plurality of cold water supply tubes; a hot water header provided in a lower portion of the cold water header and configured for receiving and discharging hot water to outside; a burner provided in a lower portion of the main body and configured for generating heat; a multi-tubing heat exchanger configured so that cold water flows through, the cold water absorbs heat from exhaust gas of the burner and is heated to medium-hot water. The medium-hot water rises therethrough and absorbs the heat generated by the burner, and is heated to hot water by absorbing heat from both sides of corresponding tube portion of the multi-tubing heat exchanger. The hot water is then delivered to the hot water header. A combustion air heat exchanger provided around the multi-tubing heat exchanger in the main body to provide the combustion air to the burner in a top to bottom direction.

Also, in the condensing boiler, the multi-tubing heat exchanger comprises: an inner tube (fire tube) disposed so as to penetrate up to a top portion of the cold water header, connected to a top portion of the burner, delivering and discharging the exhaust gas to a exhaust flue; a middle tube disposed around the inner tube (fire tube) with a first interval, connected to the cold water header and configured for delivering cold water stored in the cold water header to a bottom portion, absorbing heat from the exhaust gas rising in the inner tube (fire tube) and latent heat of vapor contained in the exhaust gas and converting the cold water to the medium-hot water; and an outer tube disposed around the middle tube with a second interval, including a top portion connected to the hot water header and a bottom portion fixed to a perimeter of a bottom portion of the inner tube (fire tube), to revert and deliver the medium-hot water discharged from the middle tube upwards therethrough, converting the medium-hot water to hot water with the heat from the burner in a fire chamber of the burner and delivering the hot water to the hot water header.

The a bottom plate of the hot water header is formed by bending in a shape of a circular arc, so as to guide the heat generated by the burner to be applied to the bottom plate of the hot water header and to guide water from a center of the bottom plate toward an edge portion so as to flow downwards. A condensate water collecting plate is provided at a lower portion of the burner, configured to collect condensate water produced in the extreme condensing boiler therein. A condensate water discharging pump (SUMP PUMP) is provided in the condensate water collecting plate, configured to discharge the collected condensate water to outside.

In addition, the combustion air heat exchanger comprises: a heat-exchanging flue exposed to the top portion of the main body, installed around the exhaust flue and configured to absorb the combustion air from the outside and to absorb heat from the exhaust gas in the exhaust flue; a combustion flue extending downwards from the heat-exchanging flue, configured to heat the combustion air with waste heat in the fire chamber connected to the bottom portion of the main body through the cold water header, through the hot water header and through the perimeter of the multi-tubing heat exchanger; and a combustion air supplier provided in a lower portion of the combustion flue and configured to supply the combustion air to the burner.

Also, the heat-exchanging flue is formed in a shape of bellows and connected with the exhaust flue, so as to absorb heat from the exhaust gas, increasing efficiency of heat-exchanging. The combustion flue is formed with repetitive protruding portions and receding portions to absorb heat from the fire chamber and from the exhaust gas, increasing a temperature of the combustion air. An insulator is provided around the combustion flue for insulation.

The heat-exchanging flue uses the atmospheric pressure and Coriolis force, so that the combustion air taken in from around the heat-exchanging flue descends with a whirlwind rotation (counterclockwise) and heat-exchanges with heat of exhaust gas rotating (clockwise) and then ascends in the heat-exchange flue, heated by the fire chamber, supplying hot combustion air to the burner and increasing the combustion efficiency and at the same time minimizing a temperature of the exhaust gas.

Effects of Invention

An extreme condensing boiler according to the invention has a slim and tall module structure and adopts heat-exchanging structure with triple-tubing or double-tubing tube including an inner tube (fire tube), a middle tube (cold water), and an outer tube (hot water), and in which cold water descends through a cold water header and is turned into medium-hot water, and the medium-hot water ascends again and absorbs heat from around it and is turned into hot water, to be supplied to a hot water header, and if necessary, through adding components and partial structural modification, they can be manufactured and used for industrial and power generating high pressure steam boilers.

With the selection of diameter of copper pipe or steel pipe for heat exchanger, it can be manufactured in small size for house, middle size for commercial and big size industries, etc. for all usages and capacities, and since it is slim and tall, large-sized boilers for industries and power generation can be made to be inserted in a chimney and installed at a lower portion of the chimney.

Since it can be installed easily in a chimney, it may be a boiler of new concepts and a future type, in which a installation space can be saved a lot.

Since it can harvest waste heat as much as possible and minimize the temperature of exhaust gas, it is possible to prevent the global warming and conserve the fossil fuels such as fast-depleting coal and petroleum.

It may be applied to heating, industrial use, power generation, ships, etc., and has been developed for introduction of high-tech and innovating extreme condensing boilers, which is necessary for the era of climate change and global warming.

EMBODIMENTS OF INVENTION

Below, referring to the figures, a condensing boiler according to an embodiment of the invention is described.

In the description or explanation, the thickness of lines, sizes of components, etc. may be exaggerated for clarity and convenience. Also, the terms have been defined considering functions in the invention, and they can be changed according to the intention and tradition of users and operators. Therefore, the definition of such terms must be decided based on the entire contents of this specification.

Figure 1:
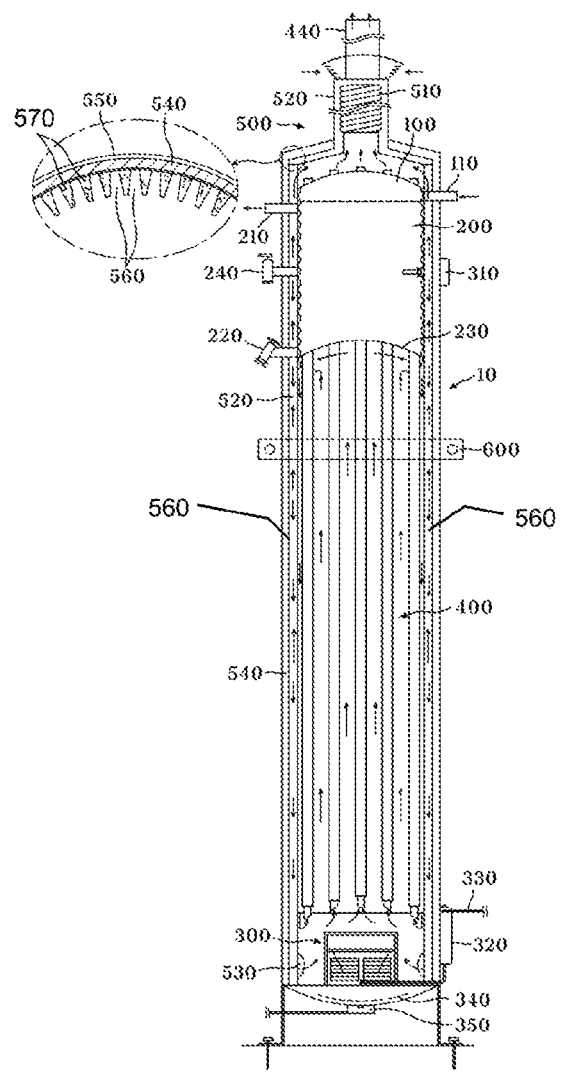
FIG. 1 is a diagram showing an extreme condensing boiler according to an embodiment of the invention.
Figure 2:
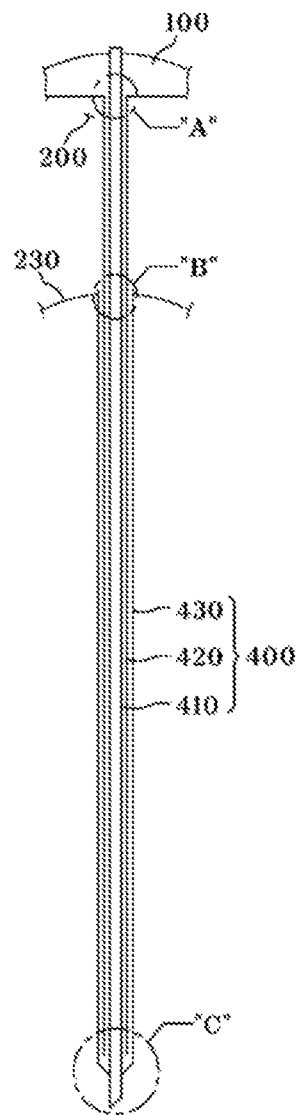
FIG. 2 is a diagram showing a multi-tubing heat exchanger of an extreme condensing boiler according to an embodiment of the invention.
Figure 3:
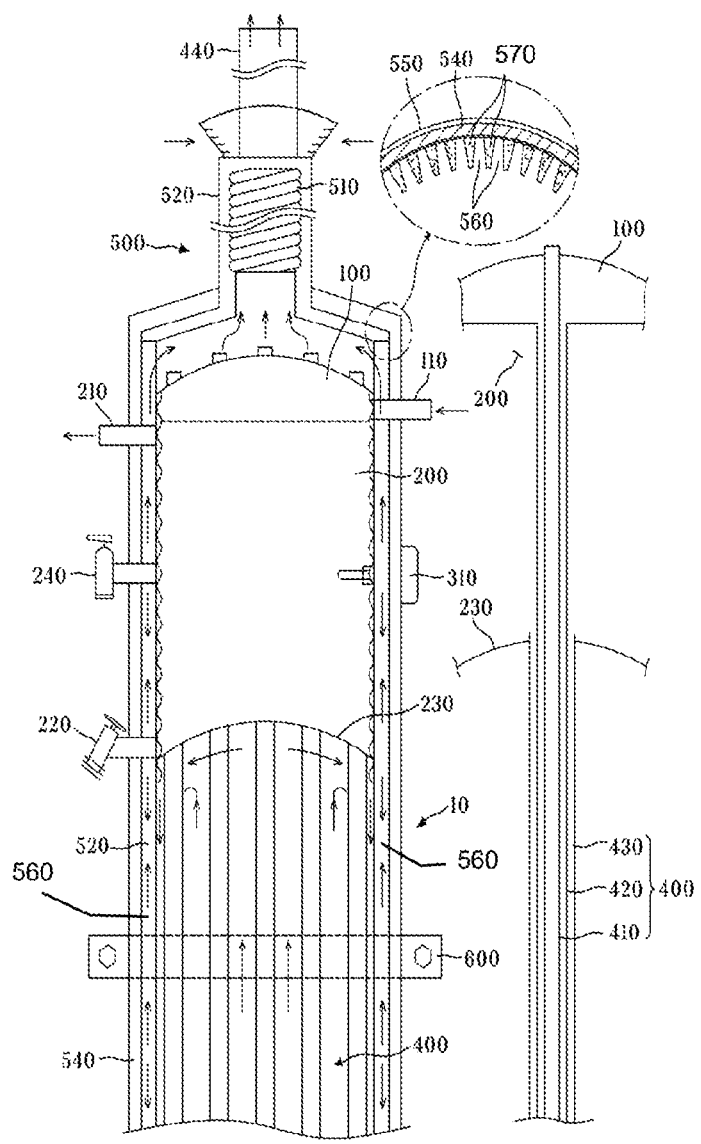
FIG. 3 is a cross-sectional view showing a top portion of an extreme condensing boiler according to an embodiment of the invention.
Figure 4:
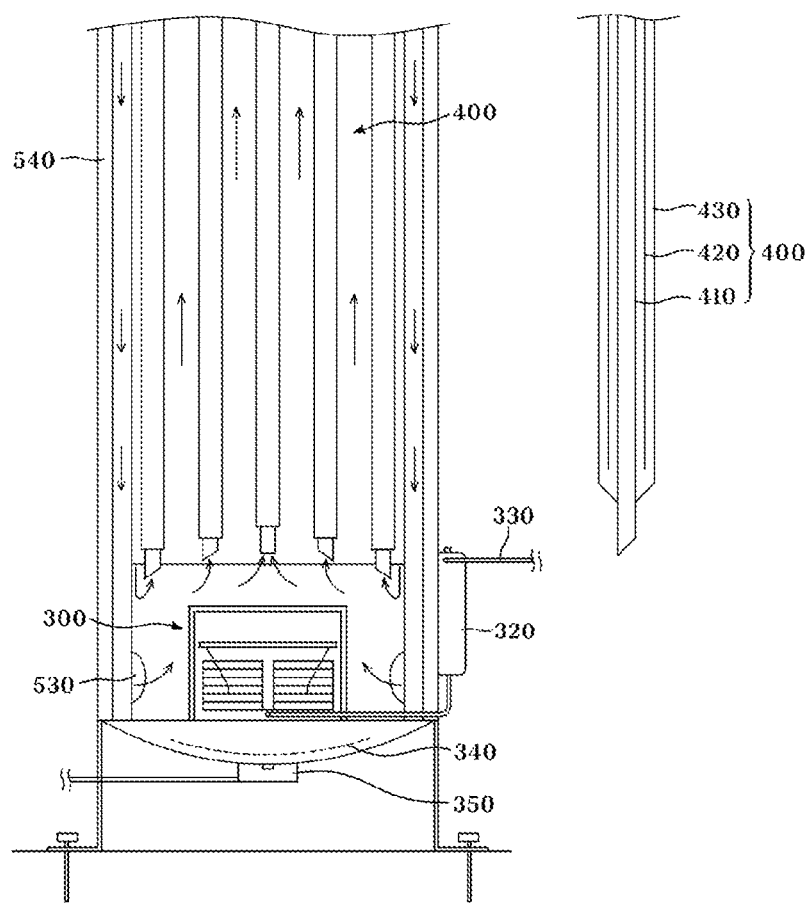
FIG. 4 is a cross-sectional view showing a bottom portion of an extreme condensing boiler according to an embodiment of the invention.

FIG. 1 is a diagram showing an extreme condensing boiler according to an embodiment of the invention, FIG. 2 is a diagram showing a multi-tubing heat exchanger of an extreme condensing boiler according to an embodiment of the invention, FIG. 3 is a cross-sectional vie showing a top portion of an extreme condensing boiler according to an embodiment of the invention and FIG. 4 is a cross-sectional vie showing a bottom portion of an extreme condensing boiler according to an embodiment of the invention.

Figure 5:
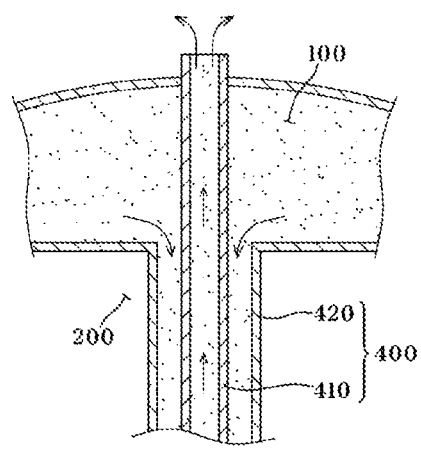
FIG. 5 is an enlarged view of "A" in FIG. 2.
Figure 6:
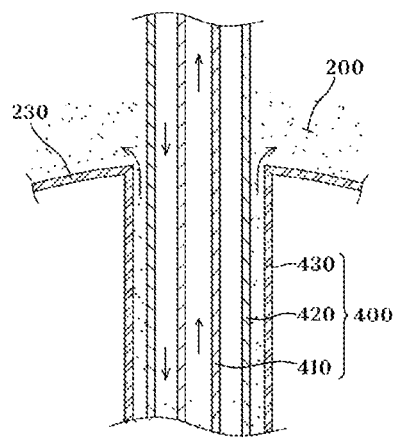
FIG. 6 is an enlarged view of "B" in FIG. 2.
Figure 7:
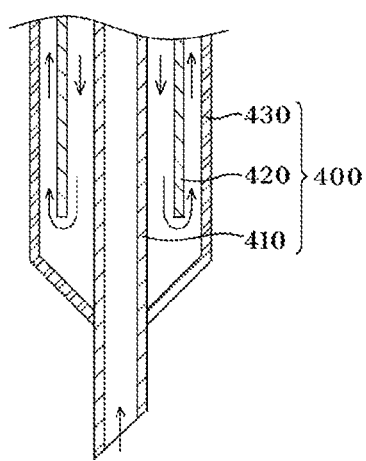
FIG. 7 is an enlarged view of "C" in FIG. 2.
Figure 8:
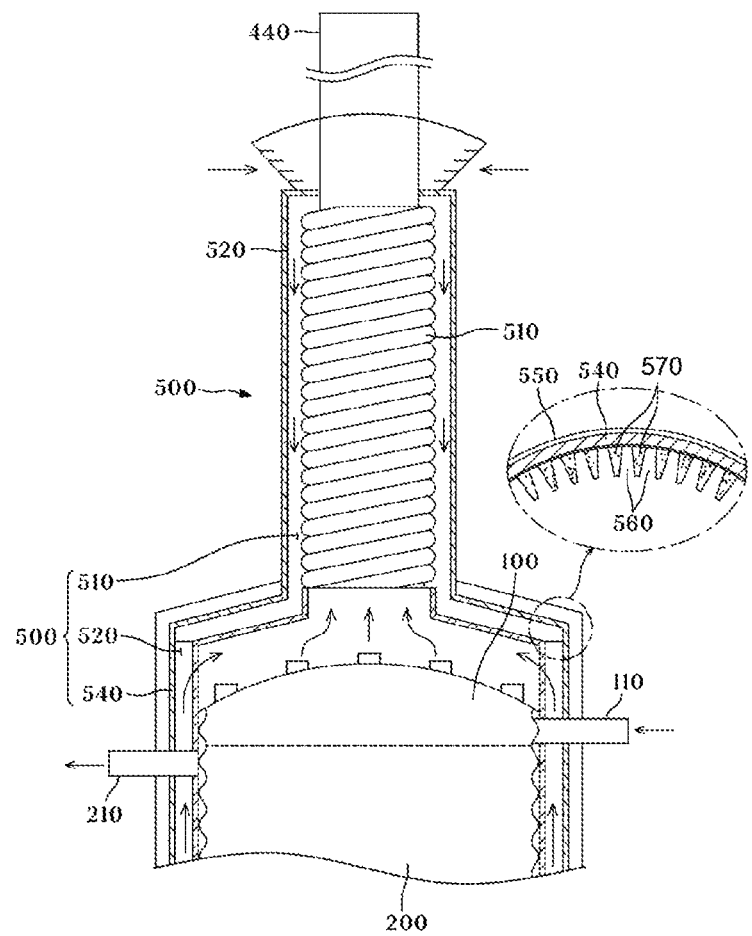
FIG. 8 is a detailed cross-sectional view showing a combustion air heat exchanger of an extreme condensing boiler according to an embodiment of the invention.
Figure 9:
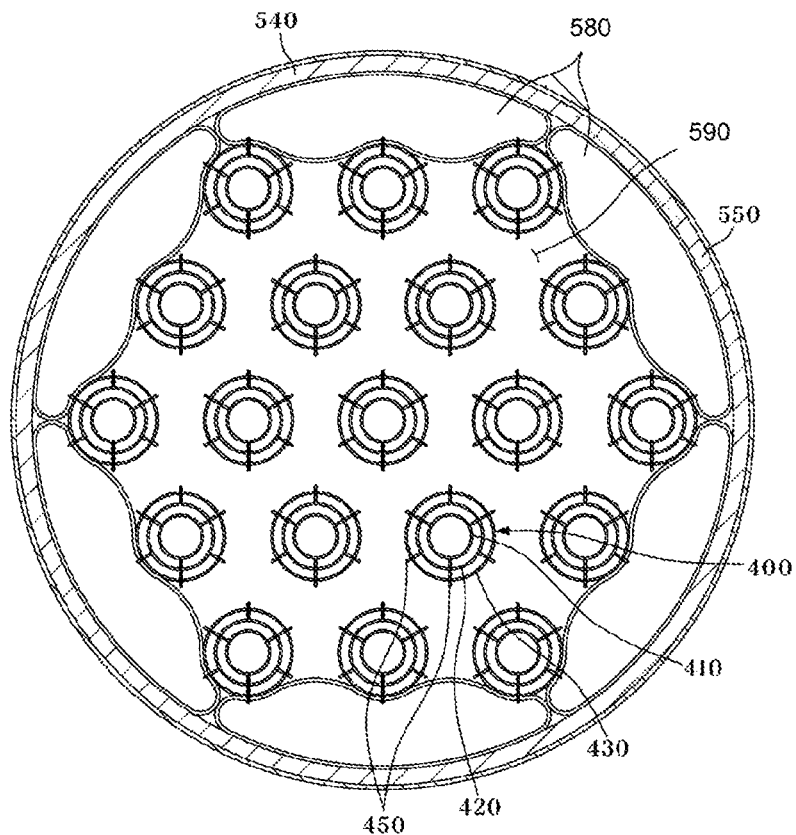
FIG. 9 is a diagram showing a path of combustion air in an outside of a fire chamber with triple-tubing installed in the fire chamber in an extreme condensing boiler (Standard boiler) according to an embodiment of the invention.
Figure 10:
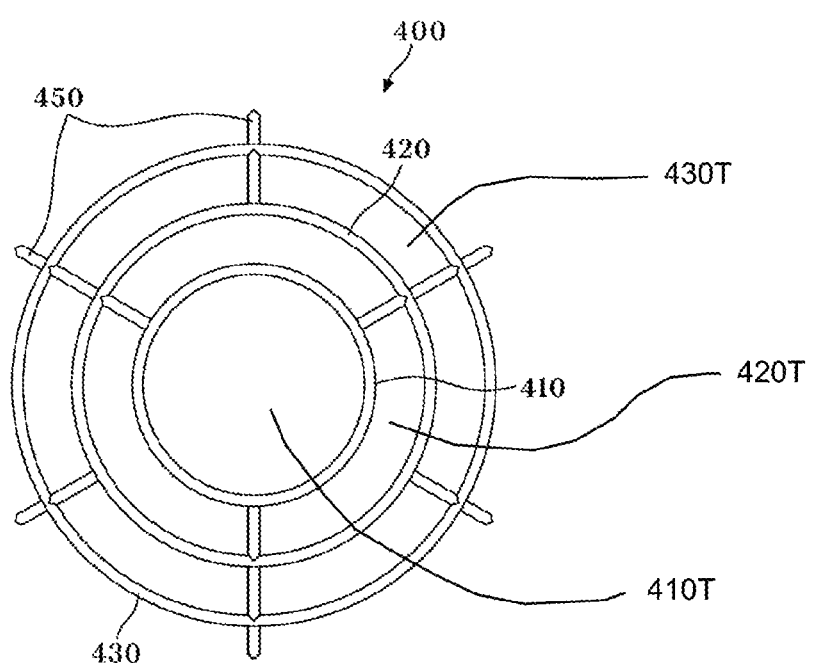
FIG. 10 is a state cross-sectional view showing interval-maintaining members in inner tube, middle tube, and outer tube of an extreme condensing boiler according to an embodiment of the invention.

FIG. 5 is an enlarged view of "A" in FIG. 2, FIG. 6 is an enlarged view of "B" in FIG. 2, FIG. 7 is an enlarged view of "C" in FIG. 2, FIG. 8 is a detailed cross-sectional view showing a combustion air heat exchanger of an extreme condensing boiler according to an embodiment of the invention, FIG. 9 is a diagram showing a path of combustion air in an outside of a fire chamber with triple-tubing installed in the fire chamber in an extreme condensing boiler according to an embodiment of the invention, and FIG. 10 is a state cross-sectional view showing interval-maintaining members in inner tube, middle tube, and outer tube of an extreme condensing boiler according to an embodiment of the invention.

Referring to FIGS. 1 to 10, a condensing boiler according to an embodiment of the invention includes a cold water header (100), a hot water header (200), a burner (300), a multi-tubing heat exchanger (400), and a combustion air heat exchanger (500).

The cold water header (100) is provided inside and at a top portion of a main body (10) and comprises a plurality of tubes. The cold water header (100) is provided with a plurality of cold water supply tubes (110).

The top portion of the cold water header (100) is formed by bending in a shape of circular arc.

Because cold water stored in the cold water header (100) descends or falls downwards and absorbs heat for heating that rises upwards and waste heat of vapor in exhaust gas, the cold water is turned into medium-hot water as descending downwards.

The hot water header (200) is provided at a lower portion of the cold water header (100) and has a structure for being provided with hot water and discharging the hot water to places of usages. The hot water header (200) includes a hot water discharge tube or domestic hot water discharge (210).

A outer bottom plate (230) corresponding to a bottom of the hot water header (200) is formed with a circularly arc plate body that is convex upwards.

The outer bottom plate (230) performs a function of guiding heat rising in a fire chamber or combustion heat ascending and descending gap (560) by a burner (300) from a central portion to an edge portion.

The burner (300) has a structure or is configured for being disposed at the bottom of the main body (10) and generating heat of high temperature.

The burner (300) is installed in a bottom space of the main body (10) and used as a heating device for providing flame to the multi-tubing heat exchanger (400).

At the lowest end of the hot water header (200) is provided a discharging valve (220) for discharging to outside precipitate including lime in water or caused in using hot water.

Since the edge portion of the outer bottom plate (230) is formed with lower step than the central portion of the outer bottom plate (230), the discharging valve (220) is preferably formed at a side of the hot water header (200) that is close to the outer bottom plate (230). This configuration is more efficient for hot water usage and discharging of precipitate.

In the hot water header (200) is provided with a high-temperature high-pressure relief valve (240) so that if high temperature and high pressure take place in the hot water header (200), it is configured to be released to outside for safety.

The high-temperature high-pressure relief valve (240) may be operated manually by a user's opening or closing it, or automatically through a controller by detecting high temperature and high pressure.

The high-temperature high-pressure relief valve (240) may be preferably provided at a side of the hot water header (200).

At a side of the hot water header (200) may be provided a temperature sensor (310) for sensing optimal temperature of hot water.

The gas control valve (320) may be operated in a mode of ratio control.

The temperature sensor (310) may control a gas control valve (320) to control the supply amount of gas, oil, etc. supplied through the fuel supply (330), maintaining an optimal temperature of the hot water header (200).

The gas control valve (320) is provided at a path of the fuel supply (330).

The open-closing amount of the gas control valve (320) is controlled by the temperature sensor (310) detecting temperature of the hot water header (200), controlling the flame of the burner (300) and maintaining an optimal temperature of the hot water header (200).

When the temperature in the hot water header (200) is above a preset temperature (75° C., for an example), the temperature sensor (310) detects that the temperature of the hot water header (200) is too high and closes (OFF) the gas control valve (320) through a controller, lowering the temperature of hot water.

On the other hand, when the temperature in the hot water header (200) is below a preset temperature (50° C., for an example), the temperature sensor (310) detects that the temperature of the hot water header (200) is too low and opens (ON) the gas control valve (320) through a controller, raising the temperature of hot water.

There, if the temperature of the hot water header (200) is above a preset temperature (higher than 120° C., for an example), then the extreme condensing boiler according to the invention may be used as a high pressure steam condensing boiler.

As in the above, since the temperature of hot water is maintained at an optimal temperature by controlling the flame of the burner (300) through ratio control between the temperature sensor (310) and the gas control valve (320), it is possible to prevent discharging exhaust heat by overheating and to conserve fuel.

The multi-tubing heat exchanger (400) is configured, so that cold water of the cold water header (100) descends and absorbs exhaust heat and waste heat so as to converting to medium-hot water, and the medium-hot water is ascended again so as to absorb heat generated by the burner (300) so as to convert hot water through both-side heat absorbing and delivering and supplying to the hot water header (200).

The multi-tubing heat exchanger (400) is applied with double-tubing and triple-tubing together so as to convert cold water to hot water. The double-tubing is applied to the bottom section of the outer bottom plate (230) of the hot water header (200) and the cold water header (100). The triple-tubing is applied to the top section of the outer bottom plate (230) of the hot water header (200) and the burner (300).

The multi-tubing heat exchanger (400) includes an inner tube (410) that penetrates the top side of the cold water header (100) and is connected to the top portion of the burner (300), raising exhaust gas and discharging to an exhaust flue (440), a middle tube (420) installed around the inner tube (410) with an interval and connected to the cold water header (100), delivering cold water stored in the cold water header (100) downwards so as to absorb exhaust heat ascending in the inner tube (410) and waste heat of vapor contained in the exhaust gas and to convert cold water to medium-hot water. An outer tube (430) installed around the middle tube (420) with an interval having a top side connected to the hot water header (200) and a bottom side fixed to a perimeter of the bottom portion of the inner tube (410) so as to revert and delivering upwards the medium-hot water discharged from the middle tube (420) and converting the medium-hot water to hot water in the fire chamber or by the combustion heat ascending and descending gap (560) by heat of the burner (300) and delivering the hot water to the hot water header (200).

The outer bottom plate (230) of the hot water header (200) is formed in a shape of circular arc and configured to guide heat generated at the burner (300) and ascending to hit the bottom center and then toward the perimeter, so as to descend.

The heat whose temperature is lowered descends through a space formed around by convection by temperature difference, ascends again from the bottom end of the heat exchanger through a plurality of fire tubes, and heats the descending cold water and retrieves the waste heat of the exhaust gas.

The heat-exchanging tubes are arranged in a hexagonal shape, forming heat-descending spaces (580) at six portions around the fire chamber or combustion heat ascending and descending gap (560), so that the heat flows downward and then upward through the exhaust flue to be used as a heat source to heat cold water, enabled by natural convective circulation.

As shown in FIGS. 2 and 3, at a connecting corner of the top portion of the outer tube (430) and the outer bottom plate (230) of the hot water header (200) can be formed a top protrusion protruding upwards by welding and the like, preventing debris such as lime and the like from entering and blocking the outer tube (430).

At a lower portion of the burner (300) is provided a condensate water collector (340) configured for collecting and discharging condensate water produced in the condensing boiler.

In the condensate water collector (340) may be provided a condensate water discharger (350) for discharging the collected condensate water to outside.

It performs a function of discharging condensate water produced in the combustion air supply (530) and the fire tube of the multi-tubing heat exchanger.

Referring to FIG. 9, the inner tube (410), the middle tube (420), and the outer tube (430) include exhaust flues (440) protruding for maintaining interval and absorbing heat, so as to maintain mutual interval among them and increase heat-absorbing efficiency.

The exhaust flue (440) is formed on an exterior surface of each of the tubes in a shape of protruding pin and fixes the position of each of the inner tube (410), the middle tube (420) and the outer tube (430), maintaining the intervals in the double-tubing or triple-tubing structure.

In order to increase the heat-absorbing efficiency and according to the diameter of tube, 3, 6, 8, or more spacers (450) may be formed on the exterior surface of the tube.

The condensate water collector (340) may be formed so as to bulge downwards gradually as going toward both centers.

The condensate water collector (340) collects condensate water including acid water (below PH 3.5) containing pollutants such as sulfur oxide ($SO_x$) and nitrogen oxide ($No_x$) and discharges at once, preventing discharging of pollutants and pollution and lengthening the life of boiler through preventing corrosion by condensate at the bottom of the boiler.

In the main body (10) may be provided a seismic strap (600) configured for preventing damage to the condensing boiler by earthquake and gas leak.

The seismic strap (600) is provided so as to enclose the main body (10) of the condensing boiler, and both end portions are installed fixedly to a wall, protecting the main body (10).

The combustion air heat exchanger (500) is provided around the multi-tubing heat exchanger (400) in the main body (10), so as to supply combustion air to the burner from the top to the bottom.

The combustion air heat exchanger (500) comprises a heat-exchanging flue (510) that is exposed to the top side in the main body (10) and installed around the exhaust flue (440), takes in combustion air from outside; a combustion flue (520) extending downwards from alongside the heat-exchanging flue (510) and connecting to the bottom portion of the main body (10), also running along the cold water header (100), the hot water header (200) and the multi-tubing heat exchanger (400), and heating the combustion air in the combustion air gap or outdoor air descending gap (570) with radiating heat (waste heat) of the fire chamber or combustion heat ascending and descending gap (560); and a combustion air supply (530) provided in a lower portion of the combustion flue (520) and supplying the heated combustion air to the burner (300).

The heat-exchanging flue (510) is connected to the exhaust flue (440) through bellows so as to absorb heat from the exhaust gas, increasing the heat-exchanging efficiency.

The combustion air heat exchanger (500) is formed with repetitive protruding portions and receding portions, absorbing heat of the fire chamber or combustion heat ascending and descending gap (560) and from exhaust heat, raising the temperature of the combustion air.

Around the combustion air heat exchanger (500) may be provided an insulator (540) for preventing radiating heat.

The insulator (540) may be formed so as to enclose the entire section from top to bottom of the main body (10) or a partial section.

On the exterior surface of the insulator (540) may be provided an outer case (550) for protecting the insulator (540) and the like. The outer case (550) is formed with metal plate of cylindrical shape.

As in the above, the combustion air descends through the combustion air heat exchanger (500) while absorbing exhaust heat and increasing temperature. At the same time the exhaust gas loses its heat to the combustion air, so that the carbon emission can be reduced drastically and therefore it is possible to reduce the air pollution and prevent the global warming.

On the other hand, referring to FIG. 8, since the heat-exchanging flue (510) is formed in a shape of bellows and helically with bendings, the Coriolis's force from the rotation of Earth may be used.

By the Coriolis's force, the cold combustion air rotates counterclockwise and descends (high density), and the hot exhaust gas rotates clockwise and ascends (low density), so as to obtain mutual heat exchanging.

The heat-exchanging flue (510) may be manufactured as bellows of aluminum foil with high thermal conductivity, so as to expand the heat-exchanging surface, optimizing the heat-exchanging function.

Since the heat-exchanging flue (510) performs heat-exchanging through combustion air and exhaust gas that whirlwind in opposite directions, the time for heat-exchanging is extended and the heat-exchanging efficiency can be maximized.

As in the above, since the combustion efficiency can be increased by pre-heating cold combustion air, the carbon emission can be reduced by absorbing heat from the exhaust gas If the extreme condensing boiler is applied to the vent of high chimneys of industrial or power-generating large-sized boiler, the reduction of exhaust temperature is further facilitated and it is possible to reduce the air pollution and the global warming.

The condensing boiler according to the invention may be manufactured into a small-sized home boiler or a mid-sized commercial boiler and a large-sized industrial and power-generating condensing boiler with selecting diameter of tube size and increasing the length of heat exchanger.

Since the chimney of industrial and power-generating boiler is high, the exhaust temperature of hundreds of degrees in Celsius in power-generating boiler can be minimized using a large-sized Coriolis vent made of aluminum.

According to the Paris Climate Change Agreement (December 2015) among 195 countries for preventing the global warming and reducing carbon emission, the usage of condensing boiler of high efficiency has been obliged in all the industrialized countries.

Since the condensing boiler according to the invention can be manufactured by selecting three for each diameter out of ½ to 10 inches of copper tubes or steel tubes according to the boiler capacity, it is possible to manufacture boilers from small size to large size for apply to residential, commercial, industrial and power generation.

While the invention has been shown and described with reference to different embodiments thereof, it will be appreciated by those skilled in the art that variations in form, detail, compositions and operation may be made without departing from the spirit and scope of the invention as defined by the accompanying claims.

Another aspect of the invention provides an extreme condensing boiler comprising a first cold water header (100), a domestic hot water header (200), a second cold water header (100A), a hydro heating hot water header (200A), a burner (300), a plurality of multi-tubing heat exchangers (400), a combustion air heat exchanger (500), an inner bottom plate (230A), and a flame divider (390).

The first cold water header (100) is provided in an upper outer portion of a main body (10) and configured for receiving from a cold water supply tube (110) and distributing cold water to cold-water down gaps (420T) of an outer group of a plurality of multi-tubing heat exchangers.

The domestic hot water header (200) is provided in a lower portion of the first cold water header (100) and configured for receiving from hot-water up gaps (430T) of the outer group of the plurality of multi-tubing heat exchangers and discharging domestic hot water to outside, or domestic hot water discharge (210).

Figure 11:
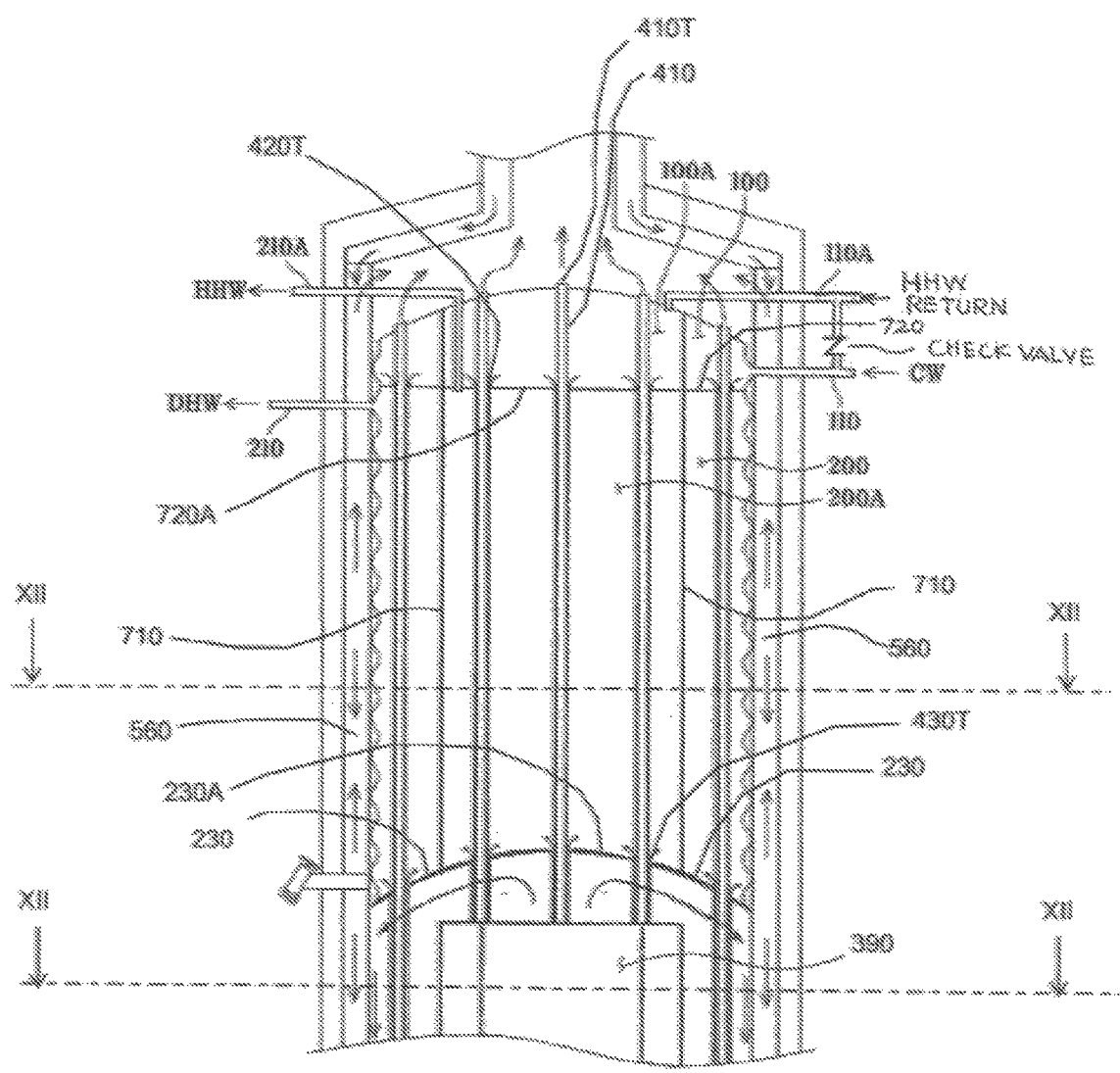
FIG. 11 is a cross-sectional view showing a top portion of a combination condensing boiler according to still another embodiment of the invention.

The second cold water header (100A) is provided in an upper inner portion of the main body (10) and configured for receiving from a cold water supply tube (110A) distributing cold water (controlled by a check valve installed between the cold water supply tube (110) and cold water supply tube (110A) as shown in FIG. 11) and hydro heating water returning from hydro heating water discharge (210A) to cold-water down gaps (420T) of an inner group of the plurality of multi-tubing heat exchangers. The hot water (HHW) from hydro heating water discharge (210A) is circulated in the hydro heating system (not shown), and then returns to HHW Return (110A) to be reheated in the condensing boiler, reheating and recirculating by the circulating pump.

The hydro heating hot water header (200A) is provided in a lower portion of the second cold water header (100A) and configured for receiving from hot-water up gaps (430T) of the inner group of the plurality of multi-tubing heat exchangers and discharging hydro heating water to outside, or hydro heating water discharge (210A).

The burner (300) is provided in a lower portion of the main body and configured for generating heat, and comprises an inner burner (300A) disposed in a central portion for a lower header and an outer burner (300) for an upper header disposed around the inner burner (300A).

Each of the plurality of multi-tubing heat exchangers (400) is configured so that cold water goes down therethrough, absorbs heat from exhaust gas of the burner, and is heated to medium-hot water; the medium-hot water rises therethrough, absorbing the heat generated by the burner, and is heated to hot water by absorbing heat from both sides of corresponding tube portion of the multi-tubing heat exchanger; then the hot water is delivered to the domestic hot water header (200), the hydro heating water header (200A), and the outer group of the plurality of multi-tubing heat exchangers disposed in an outer portion. The plurality of multi-tubing heat exchangers are configured to heat water for the domestic hot water header (200) and the inner group of the plurality of multi-tubing heat exchangers are configured to heat water for the hydro heating hot water header (200A).

The combustion air heat exchanger (500) is provided around the plurality of multi-tubing heat exchangers (400) in the main body, so as to provide the combustion air to the burner in a top to bottom direction.

The inner bottom plate (230A) of the hydro heating water header (200A) and an outer bottom plate (230) of the domestic hot water header (200) are formed by bending in a shape of a circular arc, so as to guide the heat generated by the burner to be applied to the bottom plate of the hydro heating water header and to guide heat from a center of the bottom plate toward an edge portion so as to fall downwards. A condensate water collecting plate (340) is provided at a lower portion of the burner, which is configured to collect condensate water produced in the extreme condensing boiler therein. A condensate water discharger (350) is provided in the condensate water collecting plate, configured to discharge the collected condensate water to outside.

The flame divider (390) is provided below the inner bottom plate (230A) and between flames of the inner and outer burners (300A, 300) and configured to divide inner flames and outer flames.

The first cold water header (100) and the domestic hot water header (200) are separated by an outer horizontal separation wall (720).

The second cold water header (100A) and the hydro heating water header (200A) are separated by an inner horizontal separation wall (720A).

The first cold water header (100) and the second cold water header (100A) are separated by a vertical separation wall (710) and the domestic hot water header (200). The hydro heating hot water header (200A) is separated by the vertical separation wall (710).

The combustion air heat exchanger (500) comprises a heat-exchanging flue (510), a combustion flue (520), and a combustion air supplier (530).

The heat-exchanging flue (510) is exposed to the top portion of the main body so as to be installed around the exhaust flue and configured to absorb the combustion air from the outside and absorb heat from the exhaust gas in the exhaust flue.

The combustion flue (520) extends downwards from the heat-exchanging flue and configured to heat the combustion air with waste heat in the fire chamber connected to the bottom portion of the main body through the cold water header, the hot water header, and the perimeter of the multi-tubing heat exchanger.

The combustion air supplier (530) is provided in a lower portion of the combustion flue and configured to supply the falling combustion air to the burner.

The inner burners and the outer burners are configured to operate separately, individually, or together.

Each of the plurality of multi-tubing heat exchangers may comprise an inner tube (fire tube), a middle tube, and an outer tube.

The inner tube (fire tube) is disposed so as to penetrate up to a top portion of the first cold water header (100) and the second cold water header (100A), and connected to a top portion of the burner and deliver therethrough and discharge the exhaust gas to an exhaust flue.

The middle tube is disposed around the inner tube with a first interval, connected to the first and second cold water headers up to the horizontal separation wall (720), and configured for delivering cold water stored in the first cold water header to a bottom portion thereof, absorbing heat from the exhaust gas rising in the inner tube and latent heat of vapor contained in the exhaust gas, and converting the cold water to the medium-hot water.

The outer tube is disposed around the middle tube with a second interval, wherein a top portion connected to the domestic hot water header (200) and the hydro heating water header (200A) and a bottom portion and fixed to a perimeter of a bottom portion of the inner tube, so as to revert and deliver the medium-hot water discharged from the middle tube upwards therethrough, converting the medium-hot water to hot water with the heat from the burner in a fire chamber of the burner and delivering the hot water to the hot water header.

The heat-exchanging flue (510) is formed in a shape of bellows and connected with the exhaust flue, so as to absorb heat from the exhaust gas, increasing efficiency of heat-exchanging.

The combustion flue is formed with repetitive protruding portions and receding portions, so as to absorb heat from the fire chamber and the exhaust gas, increasing a temperature of the combustion air.

An insulator is provided around the combustion flue for insulation.

Figures 12, 13:
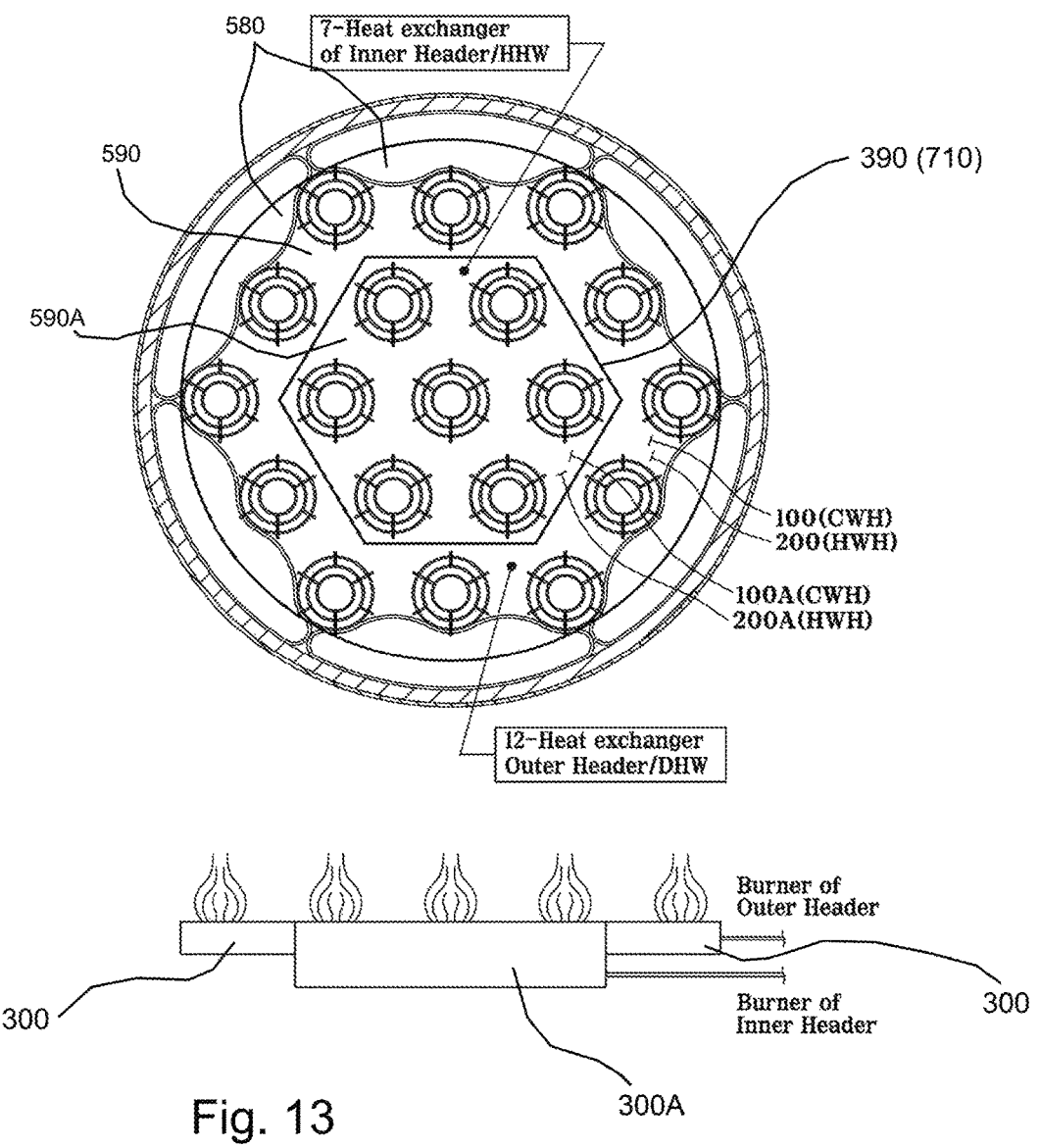
FIG. 12 is a diagram showing a path of combustion air in an outside of a fire chamber with triple-tubing installed in the fire chamber in a combination condensing boiler (Combination boiler) according to an embodiment of the invention.
FIG. 13 is a side view showing burners for outer and inner headers according to an embodiment of the invention.

In FIGS. 1, 3, and 8, the combustion heat ascends and descends through the combustion heat ascending and descending gap (560), and the outdoor air descends through the outdoor descending gap (570). FIG. 9 shows a cross-sectional view of a standard boiler with a heat descending spaces (580) and a heat-ascending spaces (590). In contrast, FIG. 12 shows a combination boiler with a heat descending spaces (580), a heat-ascending spaces for domestic hot water (590), and a heat-ascending spaces for hydro heating water (590A). They are also shown in FIGS. 1, 3, and 8. The upward and downward arrows in FIGS. 1, 3, and 11 represent outdoor air down (570), heat ascending spaces (580), and heat descending gap (560).

The ascending heat from the burner ascends through the central portions (590, 590A) and is guided to the peripheral portion (580) at the bottom surface of the bent header, so that most of the heat descends and then ascends through the fire tube at the bottom, and a portion of the heat ascends through a gap (500) formed so as to surround the headers (hot and cold), pre-heating the descending cold combustion air, heating the exterior surface of the header, and then being exhausted.

Thus, the scope of the invention must be determined by the accompanying claims.

[Reference Numerals]

10: main body
100: cold water header
100A: second cold water header
110, 110A: cold water supply tube
200: hot water header
200A: hydro heating hot water header
210: domestic hot water discharge -continued

[Reference Numerals]

210A: hydro heating water discharge
220: discharging valve
230: outer bottom plate
230A: inner bottom plate
240: high-temperature high-pressure relief valve
300: outer burner
300A: inner burner
310: temperature sensor
320: gas control valve
330: fuel supply
340: condensate water collecter
350: condensate water discharger
390: flame divider
400: multi-tubing heat exchanger
410: inner tube
420: middle tube
420T: cold-water down gap
430: outer tube
430T: hot-water up gap
440: exhaust flue
450: tube spacer
500: combustion air heat exchanger
510: heat-exchanging flue
520: combustion flue
530: combustion air supply
540: insulator
550: outer case
560: combustion heat ascending and descending gap
570: outdoor air descending gap
580: heat-descending spaces
590: heat-ascending spaces/domestic hot water
590A: heat-ascending spaces/hydro heating water
600: seismic strap
710: vertical separation wall
720: outer horizontal separation wall
720A: inner horizontal separation wall An extreme condensing boiler includes cold and hot water headers, burner, and multi-tubing heat exchanger, so that cold water absorbs heat from exhaust gas of the burner being heated to medium-hot, which absorbs heat generated by the burner being heated to hot water through absorbing heat from both sides of tube portion of the multi-tubing heat exchanger, and so that the hot water is delivered to the hot water header, and a combustion air heat exchanger is provided around the multi-tubing heat exchanger. The condensing boiler uses dual/triple tubes for fire and water tubes, increasing efficiency by absorbing heat from both sides. The fire tube is surrounded by the cold water tube so as to minimize exhaust gas temperature and maximize condensing by absorbing waste heat. The condensing boiler realizes a direct fire boiler through the fire and water tubes, and an energy-saving tankless boiler including headers and tubes only.

What is claimed is:
1. A condensing boiler comprising:
a cold water header provided in an upper portion of a main body and configured for receiving cold water from a cold water supply tube and distributing cold water to a plurality of multi-tubing heat exchangers;
a hot water header provided below a lower portion of the cold water header and configured for receiving and discharging hot water to outside;
a burner provided in a lower portion of the main body and configured for generating heat;
the plurality of multi-tubing heat exchangers configured so that cold water goes down therethrough, absorbs heat from exhaust gas of the burner, and is heated to medium-hot water, and then the medium-hot water rises therethrough, absorbs the heat generated by the burner, and is heated to hot water, through absorbing heat from both sides of corresponding tube portions of the multi-tubing heat exchanger, and then the hot water is delivered to the hot water header; and a combustion air heat exchanger provided around the multi-tubing heat exchanger in the main body, so as to provide the combustion air to the burner in a top to bottom direction.

2. The condensing boiler of claim 1, wherein the multi-tubing heat exchanger comprises:
an inner tube disposed so as to penetrate up through a top portion of the cold water header, be connected to a top portion of the burner, and deliver therethrough and discharge the exhaust gas to an exhaust flue;
a middle tube disposed around the inner tube with a first interval, connected to the cold water header, and configured for delivering cold water stored in the cold water header to a bottom portion thereof, absorbing heat from the exhaust gas rising in the inner tube and latent heat of vapor contained in the exhaust gas, and converting the cold water to the medium-hot water; and
an outer tube disposed around the middle tube with a second interval, including a top portion connected to the hot water header and a bottom portion fixed to a perimeter of a bottom portion of the inner tube, so as to revert and deliver the medium-hot water discharged from the middle tube upwards therethrough, convert the medium-hot water to hot water with the heat from the burner in a fire chamber of the burner, and deliver the hot water to the hot water header.

3. The condensing boiler of claim 2, wherein a bottom plate of the hot water header is formed by bending the bottom plate into a shape of a circular arc, so as to guide the heat generated by the burner to be applied to the bottom plate of the hot water header and guide condensate from a center of the bottom plate toward an edge portion so as to fall downwards,
wherein a condensate water collecting plate is provided at a lower portion of the burner, which is configured to collect condensate water produced in the extreme condensing boiler therein, and
wherein a condensate water discharger is provided in the condensate water collecting plate, which is configured to discharge the collected condensate water to outside.

4. The condensing boiler of claim 1, wherein the combustion air heat exchanger comprises:
a heat-exchanging flue exposed to the top portion of the main body so as to be installed around an exhaust flue and configured to let in the combustion air from the outside and absorb heat from the exhaust gas in the exhaust flue;
a combustion flue extending downwards from the heat-exchanging flue and configured to heat the combustion air with the exhaust gas heat in a fire chamber, wherein the combustion flue is connected to the bottom portion of the main body so that cold water passes through the cold water header, passes through the hot water header, and passes through the perimeter of the multi-tubing heat exchanger; and
a combustion air supplier provided in a lower portion of the combustion flue and configured to supply the combustion air to the burner.

5. The condensing boiler of claim 4, wherein the heat-exchanging flue is formed in a shape of bellows and connected with the exhaust flue, so as to absorb heat from the exhaust gas, increasing an efficiency of heat-exchanging,
wherein the combustion flue is formed with repetitive protruding portions and receding portions, so as to absorb heat from the fire chamber and the exhaust gas, increasing a temperature of the combustion air, and
wherein an insulator is provided around the combustion flue for insulation.

6. An condensing boiler comprising:
a first cold water header provided in an upper outer portion of a main body and configured for receiving cold water from a cold water supply tube and distributing cold water to cold-water down gaps of an outer group of a plurality of multi-tubing heat exchangers;
a domestic hot water header provided below a lower portion of the first cold water header and configured for receiving hot water from hot-water up gaps of the outer group of the plurality of multi-tubing heat exchangers and discharging domestic hot water to an outside;
a second cold water header provided in an upper inner portion of the main body and configured for receiving cold water from a cold water supply tube distributing cold water to cold-water down gaps of an inner group of the plurality of multi-tubing heat exchangers;
a hydro heating hot water header provided below a lower portion of the second cold water header and configured for receiving hot water from hot-water up gaps of the inner group of the plurality of multi-tubing heat exchangers and discharging hydro heating water to an outside;
a burner provided in a lower portion of the main body and configured for generating heat, and comprising an inner burner disposed in a central portion for a lower header and an outer burner for an upper header disposed around the inner burner;
a plurality of multi-tubing heat exchangers, each of which being configured so that cold water goes down therethrough, absorbs heat from exhaust gas of the burner, and is heated to medium-hot water, and then the medium-hot water rises therethrough, absorbs the heat generated by the burner, and is heated to hot water, through absorbing heat from both sides of corresponding tube portions of the multi-tubing heat exchanger, and then the hot water is delivered to the domestic hot water header and the hydro heating water header, wherein the outer group of the plurality of multi-tubing heat exchangers disposed in an outer portion are configured to heat water for the domestic hot water header and the inner group of the plurality of multi-tubing heat exchangers are configured to heat water for the hydro heating hot water header;
a combustion air heat exchanger provided around the plurality of multi-tubing heat exchangers in the main body, so as to provide the combustion air to the burner in a top to bottom direction;
an inner bottom plate of the hydro heating water header and an outer bottom plate of the domestic hot water header formed by bending the bottom plate into in a shape of a circular arc, so as to guide the heat generated by the burner to be applied to the bottom plate of the hydro heating water header and guide condensate from a center of the bottom plate toward an edge portion so as to fall downwards, wherein a condensate water collecting plate is provided at a lower portion of the burner, which is configured to collect condensate water produced in the extreme condensing boiler therein, and wherein a condensate water discharger is provided in the condensate water collecting plate, which is configured to discharge the collected condensate water to outside; and
a flame divider provided below the inner bottom plate and between flames of the inner and outer burners and configured to divide inner flames and outer flames, wherein the first cold water header and the domestic hot water header are separated by an outer horizontal separation wall,
wherein the second cold water header and the hydro heating water header are separated by an inner horizontal separation wall,
wherein the first cold water header and the second cold water header are separated by a vertical separation wall, and the domestic hot water header and the hydro heating hot water header are separated by the vertical separation wall,
wherein the combustion air heat exchanger comprises:
a heat-exchanging flue exposed to the top portion of the main body so as to be installed around an exhaust flue and configured to let in the combustion air from the outside and absorb heat from the exhaust gas in the exhaust flue;
a combustion flue extending downwards from the heat-exchanging flue and configured to heat the combustion air with the exhaust gas heat in a fire chamber, wherein the combustion flue is connected to the bottom portion of the main body so that cold water passes through the cold water header, passes through the hot water header, and passes through the perimeter of the multi-tubing heat exchanger; and
a combustion air supplier provided in a lower portion of the combustion flue and configured to supply the combustion air to the burner, and
wherein the inner burners and the outer burners are configured to operate separately, individually, or together.

7. The condensing boiler of claim 6, wherein each of the plurality of multi-tubing heat exchangers comprises:

an inner tube (fire tube) disposed so as to penetrate up through a top portion of the first cold water header and the second cold water header, be connected to a top portion of the burner, and deliver therethrough and discharge the exhaust gas to the exhaust flue;
a middle tube disposed around the inner tube with a first interval, connected to the first and second cold water headers up to the horizontal separation wall, and configured for delivering cold water stored in the first cold water header to a bottom portion thereof, absorbing heat from the exhaust gas rising in the inner tube and latent heat of vapor contained in the exhaust gas, and converting the cold water to the medium-hot water; and
an outer tube disposed around the middle tube with a second interval, including a top portion connected to the domestic hot water header and the hydro heating water header and a bottom portion fixed to a perimeter of a bottom portion of the inner tube, so as to revert and deliver the medium-hot water discharged from the middle tube upwards therethrough, convert the medium-hot water to hot water with the heat from the burner in a fire chamber of the burner, and deliver the hot water to the hot water header,
wherein the heat-exchanging flue is formed in a shape of bellows and connected with the exhaust flue, so as to absorb heat from the exhaust gas, increasing an efficiency of heat-exchanging,
wherein the combustion flue is formed with repetitive protruding portions and receding portions, so as to absorb heat from the fire chamber and the exhaust gas, increasing a temperature of the combustion air, and
wherein an insulator is provided around the combustion flue for insulation.

\* \* \* \* \*